(12) United States Patent
Shintani (10) Patent No.: US 11,559,183 B2
(45) Date of Patent: Jan. 24, 2023

(54) WET SHEET FOR CLEANING

(71) Applicant: DAIO PAPER CORPORATION, Shikokuchuo (JP)

(72) Inventor: Naoki Shintani, Shikokuchuo (JP)

(73) Assignee: DAIO PAPER CORPORATION, Shikokuchuo (JP)

(*) Notice: Subject to any disclaimer, the term of this patent is extended or adjusted under 35 U.S.C. 154(b) by 864 days.

(21) Appl. No.: 16/344,771

(22) PCT Filed: Oct. 31, 2017

(86) PCT No.: PCT/JP2017/039313
§ 371 (c)(1),
(2) Date: Apr. 24, 2019

(87) PCT Pub. No.: WO2018/079828
PCT Pub. Date: May 3, 2018

(65) Prior Publication Data
US 2019/0274512 A1    Sep. 12, 2019

(30) Foreign Application Priority Data

Oct. 31, 2016 (JP) .............................. JP2016-213856

(51) Int. Cl.
*A47L 13/17* (2006.01)
*D04H 1/485* (2012.01)
*D04H 1/498* (2012.01)

(52) U.S. Cl.
CPC .............. *A47L 13/17* (2013.01); *D04H 1/485* (2013.01); *D04H 1/498* (2013.01)

(58) Field of Classification Search
CPC ..... A47L 13/17; D04H 1/498; B32B 2432/00; B32B 2307/73; B32B 2307/738; B32B 2250/20
See application file for complete search history.

(56) References Cited

U.S. PATENT DOCUMENTS 8,937,609 B2    1/2015  Yoshida et al.
2002/0155772 A1*  10/2002  Wong ...................... B08B 1/00
                                                            442/123

(Continued)

FOREIGN PATENT DOCUMENTS

JP          3578956 B2    10/2004
JP       2005204950 A      8/2005

(Continued)

OTHER PUBLICATIONS

Mallick, P.K ... (1997). Composites Engineering Handbook. Taylor & Francis. Retrieved from https://app.knovel.com/hotlink/toc/id:kpCEH00001/composites-engineering/composites-engineering.*

(Continued)

*Primary Examiner* — Jennifer A Gillett
(74) *Attorney, Agent, or Firm* — Maier & Maier, PLLC (57) ABSTRACT

A wet sheet for cleaning includes multiple layers and is impregnated with a chemical solution. The wet sheet includes hydrophobic fiber layers arranged in a front surface layer and a back surface layer, and a hydrophilic fiber layer arranged in an intermediate layer. The hydrophobic fiber layers have an interlaced part with a high fiber density where the hydrophobic fiber layers are interlaced with the hydrophilic fiber layer. The interlaced part has at least one slightly interlaced part and at least one highly interlaced part which is formed in a dent shape and which is interlaced with a higher fiber density. The highly interlaced part is formed in an area ratio of 10 to 20% to an area of the front surface layer or the back surface layer. Static friction resistance of the wet sheet for cleaning is lower than kinetic friction resistance of the wet sheet for cleaning.

8 Claims, 4 Drawing Sheets

(56) References Cited

U.S. PATENT DOCUMENTS

2014/0183929 A1    7/2014  Matsumoto et al.
2014/0366294 A1   12/2014  Roe et al.

FOREIGN PATENT DOCUMENTS

| JP | 2011224385 A | 11/2011 |
|----|--------------|---------|
| JP | 2014113409 A | 6/2014 |
| JP | 2014129632 A | 7/2014 |
| WO | 2013179747 A1 | 12/2013 |
| WO | 2014104337 A1 | 7/2014 |

OTHER PUBLICATIONS

Extended European Search Report (EESR) dated Aug. 10, 2020 issued European Application No. 17864892.9.
Chinese Office Action dated Jul. 21, 2021, in connection with corresponding CN Application No. 201780064848.2 (13 pp., including manual English translation).
International Preliminary Report on Patentability (IPRP) (and English language translation thereof) and Written Opinion dated Apr. 30, 2019 issued in International Application No. PCT/JP2017/039313.
International Search Report (ISR) dated Jan. 30, 2018 issued in International Application No. PCT/JP2017/039313.
Written Opinion dated Jan. 30, 2018 issued in International Application No. PCT/JP2017/039313.
Chinese Office Action dated Oct. 21, 2021, in connection with corresponding CN Application No. 201780064848.2 (11 pp., including manual English translation).

\* cited by examiner

WET SHEET FOR CLEANING

TECHNICAL FIELD

The present invention relates to a wet sheet for cleaning.

BACKGROUND ART

Conventionally, there have been known wet sheets for cleaning which are made of sheet material impregnated with chemical solution. Some of such wet sheets are formed with multiple layers, where hydrophilic fiber such as rayon is provided as an inner layer and hydrophobic fiber such as polypropylene is provided as an outer layer, and the hydrophilic fiber of the inner layer is impregnated with chemical solution (ex. Patent Document 1).

CITATION LIST

Patent Literature

[Patent Document 1] Japanese Patent No. 3578956

SUMMARY OF INVENTION

Technical Problem

However, the wet sheet for cleaning described in Patent Document 1 is wet on the surface, which increases the frictional resistance with the floor surface in the cleaning of the floor and requires a high load for the wet sheet to slide on the floor surface, for example. The load is placed onto the wet sheet for cleaning, and the chemical solution with which the sheet is impregnated is excessively discharged. Thus, problematically, collected trash and dust may adhere to the floor surface with the chemical solution.

An object of the present invention is to provide a wet sheet for cleaning which may control the excessive discharge of chemical solution, prevent the release of collected objects, and improve the efficiency of collection.

Solution to Problem

In order to solve the above problems, the present invention described is a wet sheet for cleaning including multiple layers and being impregnated with chemical solution, the wet sheet for cleaning including:

hydrophobic fiber layers which are each arranged in a front surface layer and a back surface layer; and a hydrophilic fiber layer which is arranged in an intermediate layer between the hydrophobic fiber layers, wherein the hydrophobic fiber layers have an interlaced part with a high fiber density where the hydrophobic fiber layers are interlaced with the hydrophilic fiber layer, wherein the interlaced part has, on the surface layer and the back surface layer, at least one slightly interlaced part and at least one highly interlaced part which is formed in a dent shape and which is interlaced with a fiber density higher than a fiber density of the slightly interlaced part, wherein the highly interlaced part is formed in an area ratio of 10 to 20% to an area of the front surface layer or the back surface layer in a plan view, and wherein the hydrophilic fiber layer is impregnated with the chemical solution whose discharge amount is 0.001 to 0.0038 g/cm².

According to the invention, as the highly interlaced parts are formed to have an area ratio of 10 to 20% to the surface area of the front surface layer or the back surface layer in a plan view with a static friction resistance of 300 to 500 cN and the discharge amount of the chemical solution is 0.0010 to 0.0038 g/100 cm², the chemical solution is not excessively discharged and collected trash and dust is not released with the discharged chemical solution. Thus, the efficiency of collection of the wet sheet for cleaning may be improved.

In some embodiments, the chemical solution in the wet sheet for cleaning has a viscosity of 1 to 15 mPa s at 25° C.

In some embodiments, the wet sheet for cleaning is impregnated with the chemical solution with a viscosity of 1 to 15 mPa·s at 25° C., and may discharge the chemical solution in a more suitably adjusted amount. Thus, the efficiency of collection of the wet sheet for cleaning may be improved.

In some embodiments, the hydrophobic fiber layer includes polyethylene terephthalate fiber at a rate of 80% or more and a fiber diameter of the polyethylene terephthalate fiber is 3.3 dtex or more.

In some embodiments, the polyethylene terephthalate fiber of the hydrophobic fiber layer with a fiber diameter equal to or more than 3.3 dtex improves the rigidity (cushioning property) of the fiber, making it possible to handle it with a little force. Moreover, the polyethylene terephthalate fiber with a large fiber diameter equal to or more than 3.3 dtex may keep inter-fiber voids not to cause capillary actions easily and prevent the chemical solution to be discharged from the inner layer to the outer layers.

In some embodiments, the at least one highly interlaced part includes a plurality of highly interlaced parts and the at least one slightly interlaced part includes a plurality of slightly interlaced parts, and wherein the highly interlaced parts and the slightly interlaced parts are extended in a direction almost perpendicular to a direction of wiping of the wet sheet for cleaning and are formed alternately and successively in the direction of wiping.

In some embodiments, as the highly interlaced parts and the slightly interlaced parts are extended in a direction almost perpendicular to a direction of wiping of the wet sheet for cleaning and are formed alternately and successively in the direction of wiping. Thus, different kinds of trash and dust may be collected at the highly interlaced parts and the slightly interlaced parts alternately, and high efficiency of collection may be fulfilled.

In some embodiments, static friction resistance of the wet sheet for cleaning is lower than kinetic friction resistance of the wet sheet for cleaning, and wherein the static friction resistance is 300 to 500 cN in the direction of wiping and 200 to 400 cN in a direction perpendicular to the direction of wiping.

In some embodiments, as the static friction resistance is lower than the kinetic friction resistance and the static resistance is 300 to 500 cN in the direction of wiping and 200 to 400 cN in the direction perpendicular to the direction of wiping, the initial load required at the start of wiping action of the wet sheet for cleaning may be decreased and the excessive discharge of the chemical solution may be restrained further. The wet sheet for cleaning may slide with a smaller load and the light touch of wiping may be realized.

In some embodiments, the slightly interlaced part is a part where a water-jet interlacing is done under a low pressure condition, and wherein the highly interlaced part is a part formed in a dent shape where a water-jet interlacing is done under a high pressure condition to the part where the water-jet interlacing is done under the low pressure condition.

In some embodiments, the slightly interlaced part is a part where the water-jet interlacing is done under a low pressure condition, and the highly interlaced part is apart formed in a dent shape where the water-jet interlacing is done under a high pressure condition to the part where the water-jet interlacing is done under a low pressure condition.

Thus, though the thickness of the outer layer is small and the dischargeability of the chemical solution is higher, trash is not released from the fiber with the chemical solution being discharged because of a high fiber density of the outer layer.

Advantageous Effects of Invention

According to the present invention, the wet sheet for cleaning may control the excessive discharge of chemical solution, prevent the release of collected objects, and improve the efficiency of collection.

DESCRIPTION OF EMBODIMENTS

Hereinafter, the wet sheet for cleaning as an embodiment of the present invention is described in detail with reference to the drawings. However, the scope of the invention is not limited to the illustrated examples.

The wet sheet for cleaning in the embodiment of the present invention is described on the basis of FIGS. 1 to 4.

Figure 1:
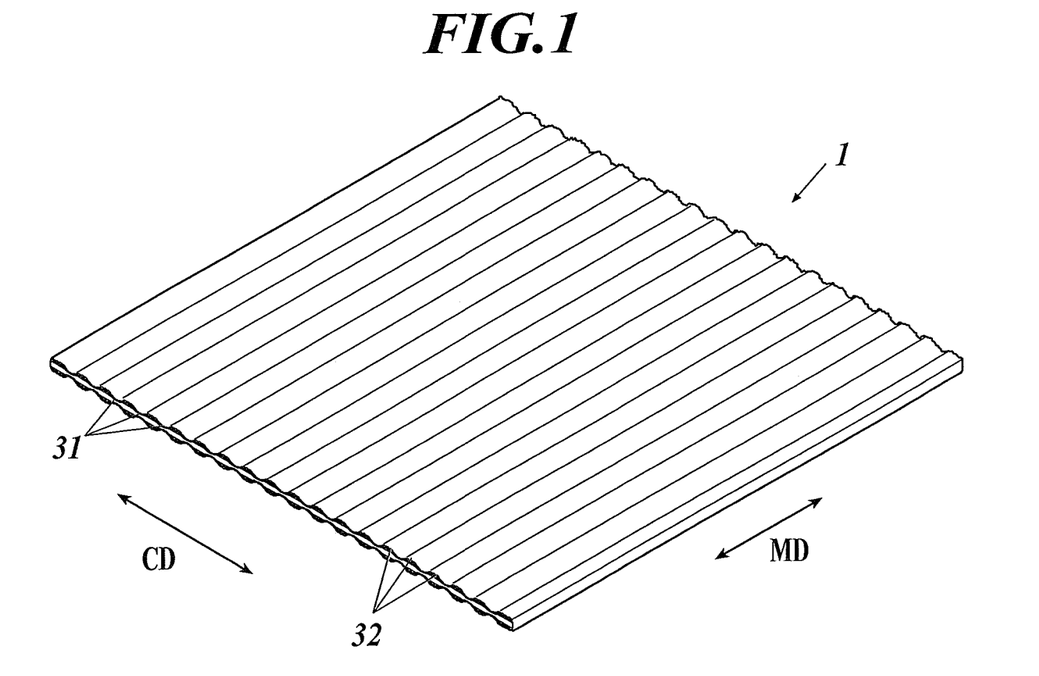
FIG. 1 is a schematic perspective view of the wet sheet for cleaning in an embodiment of the present invention.
Figure 2A:
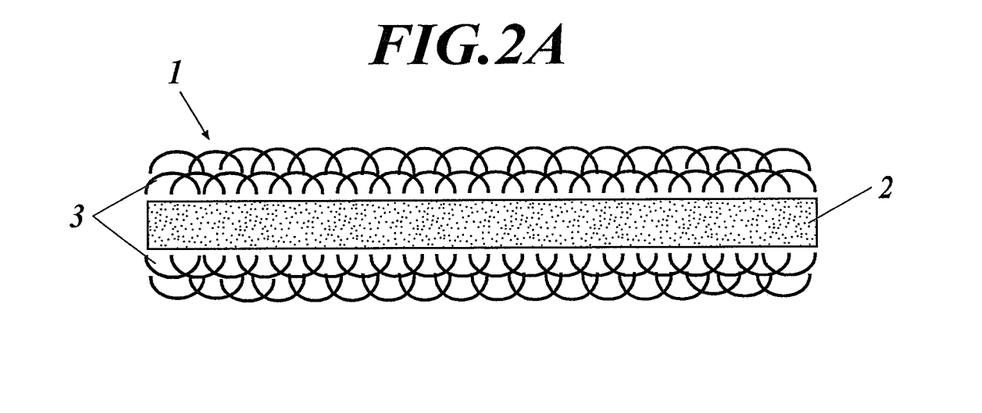
FIG. 2A is a schematic cross-sectional view of the wet sheet for cleaning in an embodiment of the present invention.

As shown in FIG. 2A, the wet sheet for cleaning 1 is provided with an inner layer 2 as a hydrophilic fiber layer and outer layers 3 as hydrophobic fiber layers.

The inner layer 2 is an intermediate layer arranged between the outer layers 3 described later and is formed mainly with hydrophilic fiber impregnated with chemical solution.

The inner layer 2 is formed to have a grammage of 10 to 50 g/m$^2$ and a weight ratio of 10 to 60% to the gross weight including the outer layers 3 described later.

Natural fiber such as pulp, cotton, and hemp and cellulosic chemical fiber such as rayon and acetate may be used as the hydrophilic fiber, but pulp is preferably used in view of maintenance of the water retention property.

Under some conditions of the sort of pulp or its contained amount, etc., pulp may not be sufficiently durable as the hydrophilic fiber or may be unpreferable in terms of the size stability. From these points of view, air through nonwoven fabric, spun bond nonwoven fabric, a sheet of pulp and nonwoven fabric attached together, or a porous nonwoven sheet which may be designable, having a grammage of 10 to 20 g/m$^2$, may be used for the inner layer 2 so that the durability of the sheet or the stability of the size may be kept.

The inner layer 2 is preferably configured with hydrophilic fiber only but may include hydrophobic fiber as needed.

The chemical solution is used as cleaning detergent of the wet sheet for cleaning 1 and is to be discharged from the front surface layer or the back surface layer through the outer layers 3 described later. The chemical solution is prepared with a viscosity of 1 to 15 mPa·s at 25° C.

A lower alcohol such as ethanol, a surfactant such as benzalkonium chloride, a bactericide, and propylene glycol monomethyl ether (PGME) dissolved in water are used as the chemical solution, for example.

Figure 2B:
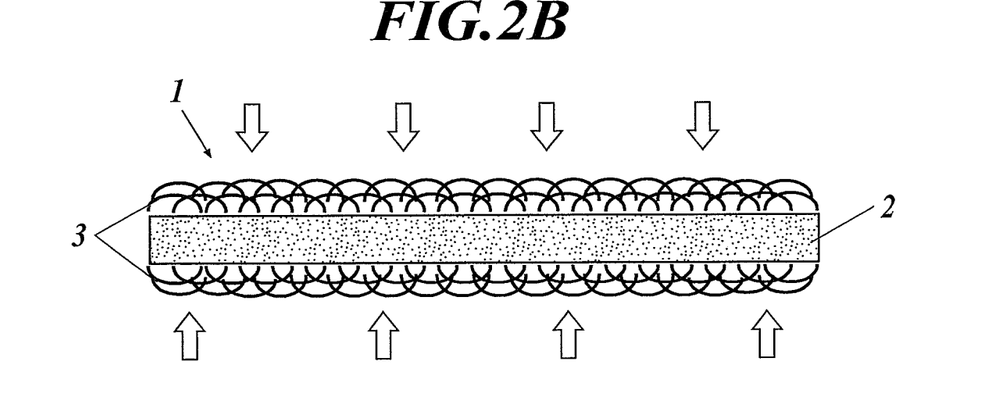
FIG. 2B is a schematic cross-sectional view of the wet sheet for cleaning in an embodiment of the present invention.

As shown in FIG. 2B, the outer layers 3 form the front surface layer and the back surface layer of the wet sheet for cleaning 1, and each layer is mainly formed with hydrophobic fiber. Specifically, the hydrophobic fiber is included at a weight rate of 50 to 99% to the gross weight of the outer layers 3.

The outer layers 3 form the front surface layer and the back surface layer of the wet sheet for cleaning 1, and each layer is formed entirely with hydrophobic fiber. Chemical fiber mainly composed of polyethylene terephthalate, polypropylene, polyethylene, etc. are used as the hydrophobic fiber. The polyethylene terephthalate fiber is preferably included at a rate equal to or more than 80%, and the fiber diameter is preferably equal to or more than 3.3 dtex.

With the fiber diameter equal to or more than 3.3 dtex, the rigidity (cushioning property) of the fiber improves, making it possible to handle it with a little force. Moreover, polyethylene terephthalate fiber with a large fiber diameter equal to or more than 3.3 dtex may keep inter-fiber voids not to cause capillary actions easily and prevent the chemical solution to be discharged from the inner layer 2 to the outer layers 3.

In pre-interlacing to combine the outer layers 3 with the inner layer 2, water is poured to the whole surface of the outer layers 3 from either side of the front surface layer and the back surface layer with a small water pressure of less than 20 kPa. After that, the first water-jet interlacing is done with a water pressure of 20 to 30 kPa and then the second water-jet interlacing is done with a water pressure of 60 to 80 kPa at parts to be the patterned parts 31 described later. In that way, the shape with bumps and dents is formed.

As for the outer layers 3, two or more kinds of chemical fiber (synthetic fiber) of 20 to 25 g/m$^2$ in grammage are preferably used as the front surface layer and the back surface layer each in view of the dischargeability of the chemical solution.

Figure 2C:
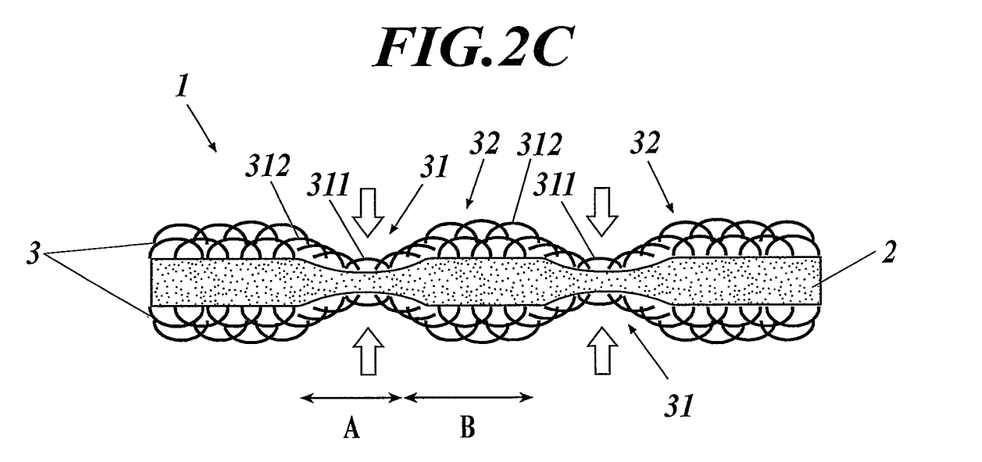
FIG. 2C is a schematic cross-sectional view of the wet sheet for cleaning in an embodiment of the present invention.
Figure 3:
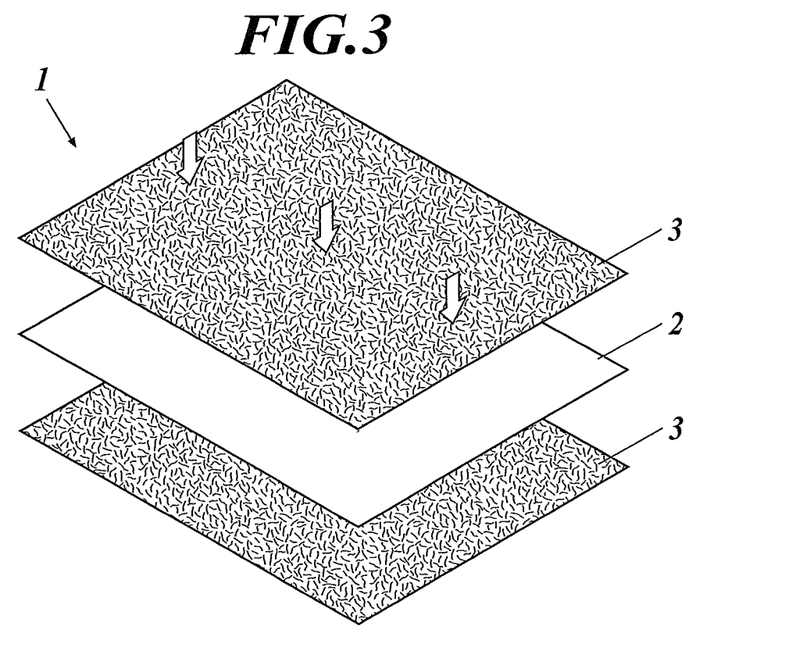
FIG. 3 is a schematic perspective exploded view of the wet sheet for cleaning in an embodiment of the present invention.

As shown in FIG. 2C, the outer layer 3 includes the patterned parts 31 as highly interlaced parts and the non-patterned parts 32 as slightly interlaced parts.

In the second water-jet interlacing, water is poured with a water pressure of 60 to 80 kPa to the outer layer 3 which has been combined in the first water-jet interlacing and fibers are compressed. As a result of a higher fiber density, the patterned part 31 is indented in a dent shape compared to the non-patterned part 32 described later That is, the patterned part 31 includes a bottom 311 which is the bottom of the dent and an inclined part 312 which is an inclined surface connecting the non-patterned part 32 described later and the bottom 311.

Figure 4:
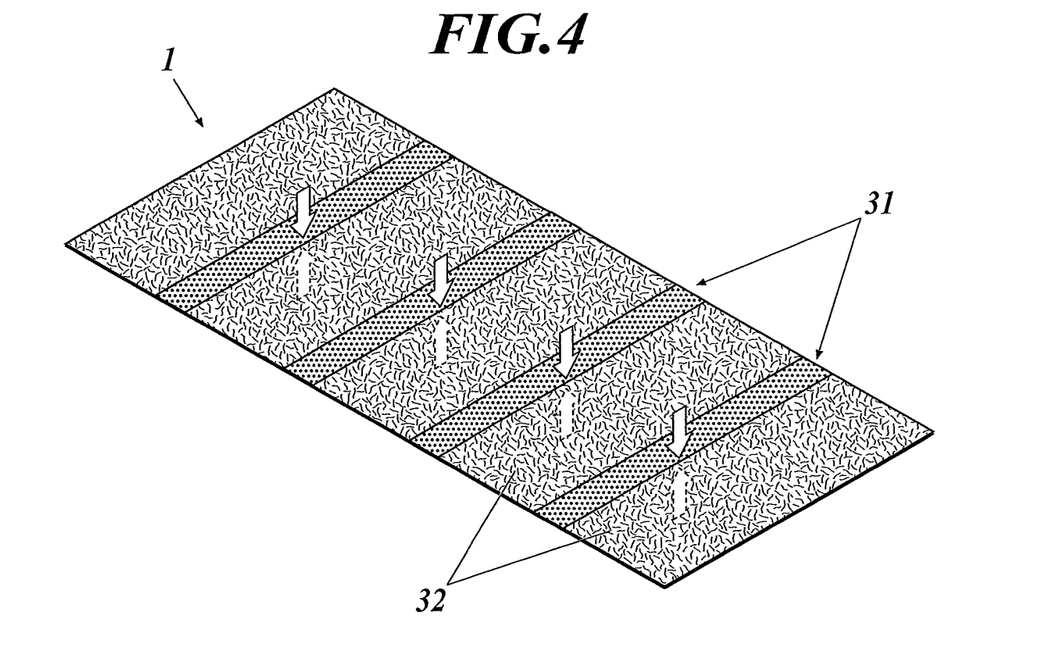
FIG. 4 is a schematic drawing of a pattern of the wet sheet for cleaning in an embodiment of the present invention.

The patterned parts 31 and the non-patterned parts 32 are extended along the direction (direction MD) perpendicular to the direction of wiping (direction CD) when the wet sheet for cleaning 1 is used, and arranged alternately along the direction of wiping. The patterned parts 31 are formed in multiple rows separated at predetermined intervals. Those patterned parts 31 are formed to have an area ratio of 10 to 20% to the surface area of the front surface or the back surface of the wet sheet for cleaning 1 in a plan view. The discharge amount of the chemical solution is 0.001 to 0.038 g/cm$^2$ in this state. Here, the area ratio represents a ratio between the patterned surface A and the non-patterned surface B, where the patterned surface A is a surface area of the patterned parts 31 in a plan view and the non-patterned surface B is a surface area of the non-patterned parts 32 in a plan view. The area ratio is calculated by the following formula.

$$\text{Area ratio (\%)} = A/(A+B) \times 100 \quad \text{(Formula 1)}$$

Chemical fiber mainly composed of polyethylene terephthalate, polypropylene, polyethylene, etc. is used as the hydrophobic fiber. Specifically, the outer layer 3 includes polyethylene terephthalate by 90% and either or both of polypropylene and polyethylene by 10% as the hydrophobic fiber.

The non-patterned part 32 is a part where the second water-jet interlacing is not done and is not affected by fiber compression other than the pre-interlacing and the first water-jet interlacing. The non-patterned part 32 mainly slides on the surface to be cleaned in the wiping action of the wet sheet for cleaning 1. Thus, the load (friction resistance against the surface to be cleaned) required for the wet sheet for cleaning 1 to slide on the surface to be cleaned is adjusted by the area ratio of the patterned parts 31. In other words, the outer layers 3 have lower static friction resistance and kinetic friction resistance compared to those without the patterned parts 31. The kinetic friction resistance is higher than the static friction resistance. Specifically, the static friction resistance is 300 to 500 cN in the direction CD and 200-400 cN in the direction MD.

To sum up, as the friction resistance is lower when the surface to be cleaned is wiped with the wet sheet for cleaning 1, a light touch of wiping may be obtained, and, as the kinetic friction resistance is higher than the static friction resistance, the load at the start of wiping action is smaller.

Accordingly, the discharge amount of the chemical solution discharged from the wet sheet for cleaning 1 to the surface to be cleaned is not to be excessive even though the chemical solution is prepared with a viscosity of 1 to 15 mPa·s at 25° C., as no excessive load is placed. Thus, the objects collected on the outer layer 3 are not released to the surface to be cleaned with the chemical solution.

According to this embodiment of the wet sheet for cleaning 1, as the patterned parts 31 are formed to have an area ratio of 10 to 20% to the surface area of the front surface layer or the back surface layer in a plan view with a static friction resistance of 300 to 500 cN and the discharge amount of the chemical solution is 0.001 to 0.0038 g/100 cm$^2$, the chemical solution is not excessively discharged and collected trash and dust is not released with the discharged chemical solution. Thus, the efficiency of collection of the wet sheet for cleaning 1 may be improved.

According to this embodiment, the wet sheet for cleaning 1 is impregnated with the chemical solution with a viscosity of 1 to 15 mPa·s at 25° C., and may discharge the chemical solution in a more suitably adjusted amount. Thus, the efficiency of collection of the wet sheet for cleaning may be improved.

According to this embodiment, as the patterned parts 31 are extended perpendicularly to the direction CD, trash and dust may be collected alternately at the contacting surface and the separated surface of the wet sheet for cleaning 1 and different kinds of trash and dust may be collected at the patterned parts 31 and the parts other than the patterned parts 31. Thus, high efficiency of collection may be fulfilled.

According to this embodiment, as the static friction resistance is lower than the kinetic friction resistance and the static resistance is 300 to 500 cN in the direction CD and 200 to 400 cN in the direction MD, the initial load required at the start of wiping action of the wet sheet for cleaning 1 may be decreased and the excessive discharge of the chemical solution may be restrained further. The wet sheet for cleaning 1 may slide with a smaller load and the light touch of wiping may be realized.

The present invention is not limited to the embodiment described above and modification examples, and it is natural that the specific configurations may be suitably modified.

EXAMPLES

Example 1

In Example 1, the wet sheet for cleaning 1 as shown below was used.

Nonwoven fabric mainly composed of polyethylene terephthalate was used for the outer layers 3.

Chemical fiber mainly composed of polyethylene terephthalate, polypropylene, polyethylene, etc. was used as the hydrophobic fiber.

Specifically, the outer layer 3 was composed of hydrophobic fiber by 100%, where polyethylene terephthalate was contained by 90% as hydrophobic fiber and core-sheath fiber of polypropylene and polyethylene was contained by 10% as binder fiber. The polyethylene terephthalate fiber of 3.3 dtex in fineness and the binder fiber of 1.7 dtex in fineness were used.

As for the inner layer 2, the hydrophilic fiber inner layer 21 was composed of pulp of 50 g/m$^2$ in grammage, and the hydrophobic fiber inner layer 22 was composed of 2.9 dtex PP spunbond nonwoven fabric of 20 g/m$^2$ in grammage. The inner layer 2 as a whole contained pulp by 71 wt % and hydrophobic fiber by 29 wt %.

Fiber mainly composed of pulp material was used as the hydrophilic fiber for the inner layer 2.

Surfactants (anionic surfactant, nonionic surfactant, cationic surfactant and amphoteric surfactant) and water-soluble solvents (monohydric alcohol or polyhydric alcohol) in water as a solvent were used for the chemical solution. Used in this embodiment were Prestall by 1% as nonionic surfactant, lauryldimethylamine oxide by 0.5% as amphoteric surfactant, ethanol by 3.4% and 1-methoxy-2-propanol by 1.4% as alcohol, and Benzalkonium chloride by 0.05% as quaternary ammonium salt. The chemical solution was prepared with a viscosity of 2.8 mPa·s at 25° C. The inner layer 2 was impregnated with the chemical solution at an impregnation rate of 250%.

The patterned part 31 on the outer layer 3 was formed to have an area ratio of 10% to the surface area of the outer layer in a plan view.

Example 2

The wet sheet for cleaning 1 of Example 2 was formed to have a patterned part 31 on the outer layer 3 in an area ratio of 15% to the surface area of the outer layer in a plan view.

The configurations besides the above were the same as those of Example 1.

Example 3

The wet sheet for cleaning 1 of Example 3 was formed to have a patterned part 31 on the outer layer 3 in an area ratio of 20% to the surface area of the outer layer in a plan view.

The configurations besides the above were the same as those of Example 1.

Comparative Example 1

The wet sheet for cleaning 1 of Comparative Example 1 was formed to have a patterned part 31 on the outer layer 3 in an area ratio of 22% to the surface area of the outer layer in a plan view.

The configurations besides the above were the same as those of Example 1.

Comparative Example 2

The wet sheet for cleaning 1 of Comparative Example 2 was formed to have a patterned part 31 on the outer layer 3 in an area ratio of 5% to the surface area of the outer layer in a plan view.

The configurations besides the above were the same as those of Example 1.

Comparative Example 3

The wet sheet for cleaning 1 of Comparative Example 3 was formed to have a patterned part 31 on the outer layer 3 in an area ratio of 0% to the surface area of the outer layer in a plan view. That is, the patterned part 31 was not present.

The configurations besides the above were the same as those of Example 1.

The test of floor wiping was executed using the wet sheets for cleaning 1 in Examples 1 to 3 and Comparative Examples 1 to 3 described above.

The test method involved attaching the wet sheet for cleaning 1 to a fixing tool of the wet sheet for cleaning 1 not described in the drawings and wiping the floor surface formed of an acryl board by sliding on it.

As for the fixing tool, a flat board member was attached to the tip of a stick member (grip), rotatable in all the directions. The wet sheet for cleaning 1 was attached to the flat board member.

A weight of 450 g was attached to the flat board member so that the pushing pressure between the wet sheet for cleaning 1 and the floor surface was constant.

As the test of the collection efficiency, some kinds of objects to be collected were placed on the surface to be wiped which was the floor surface made of an acryl board, and the amount of collected objects was measured.

In a wiping action, the wet sheet for cleaning 1 was moved by 25 cm from the center to the right, by 50 cm to the left, and by 25 cm to the right again, on the surface to be wiped of 50 cm in width to go and back a single time on the surface to be cleaned.

The test was executed for two kinds of collected objects, dust and hair, where hair was for light trash.

Figure 5:
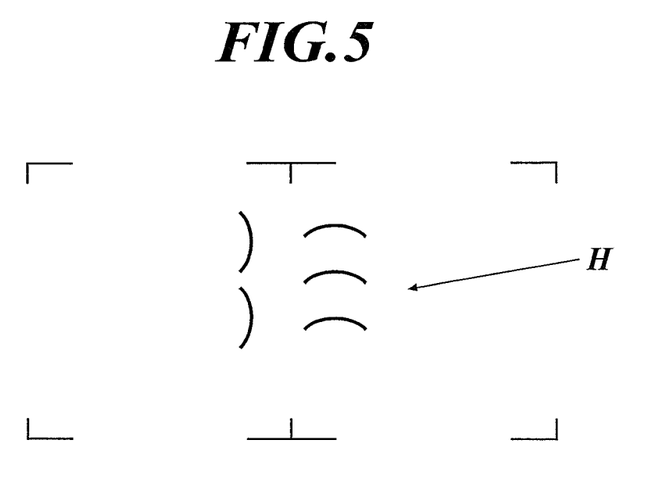
FIG. 5 is a schematic drawing showing a test method of Examples and Comparative Examples in the present invention.

Specifically, hairs H were wiped as 3 hairs H were placed along the direction of wiping and 2 hairs H were placed perpendicular to the direction of wiping, as shown in FIG. 5.

As for dust, JIS Z 8901 test powders 1 No. 7 (Kanto loam layer) which passed through a sieve of 200 mesh were obtained by 0.2 g and placed in a bordered area of 5 cm×15 cm of the floor surface. Then, the amount of dust wiped off was checked visually and evaluation of whether it was caught or not caught was made.

As for the discharge amount of the chemical solution, the wet sheet for cleaning 1 (in a size of 100×100 mm) impregnated with the chemical solution was placed on the floor surface of acryl board in a size of 110×110 mm, and after a weight of 400 g with a bottom surface in a size of 100×100 mm was put on the wet sheet for cleaning 1 for one minute, the weight and the wet sheet for cleaning 1 were removed, and then the discharge amount of the chemical solution discharged on the acryl board was measured in the balance quickly.

The results of test and evaluation are shown in Table 1.

TABLE 1

| | Discharge Amount | Patterning | Collection Efficiency | |
|---|---|---|---|---|
| | (g/100 cm2) | Rate (%) | Light Trash | Dust |
| Example 1 | 0.0014 | 10 | 5 out of 5 hairs | Caught |
| Example 2 | 0.0033 | 15 | 4 out of 5 hairs | Caught |
| Example 3 | 0.0038 | 20 | 3 out of 5 hairs | Caught |
| Comparative Example 1 | 0.0041 | 22 | 1 out of 5 hairs | Not caught |
| Comparative Example 2 | 0.0042 | 5 | 1 out of 5 hairs | Not caught |
| Comparative Example 3 | 0.0042 | 0 | 0 out of 5 hairs | Not caught |

As shown in Table 1, significant differences were observed between Examples 1 to 3 and Comparative Examples 1 to 3 for hairs H and dust. Specifically, in the results of Examples 1 to 3, 3 to 5 out of 5 hairs H were collected, and comparatively, in the results of Comparative Examples 1 to 3, 0 or 1 hair was collected. Dust was collected well in Examples 1 to 3, too, but not sufficiently in Comparative Examples 1 to 3.

The discharge amount of the chemical solution was 0.0038 g/cm² or less in Examples 1 to 3 and 0.0040 g/cm² or more in Comparative Examples 1 to 3.

It was observed from the above results that, when a patterning rate was 22%, the discharge amount was as large as when there was no pattern, and no object was collected or collected objects were released again because of the excessive discharge of the chemical solution. Hairs, especially, tended not to be collected by the sheet, because hairs adhered to the floor surface more as the discharge amount of the chemical solution was larger.

Thus, it is concluded that the efficiency of collection of the wet sheet for cleaning 1 is high when the patterning rate is 10 to 20% of the area ratio where the discharge amount of the chemical solution is 0.0038 g/cm² or less.

INDUSTRIAL APPLICABILITY

The present invention is suitably applicable for a wet sheet for cleaning.

INDUSTRIAL APPLICABILITY

1 Wet Sheet for Cleaning
2 Inner Layer (Hydrophilic Fiber Layer)
3 Outer Layer (Hydrophobic Fiber Layer)
31 Patterned Part (Highly Interlaced Part)
32 Non-patterned Part (Slightly Interlaced Part)

311 Bottom
312 Inclined Part
A Patterned Surface
B Non-patterned Surface
H A Hair

The invention claimed is:

1. A wet sheet for cleaning comprising multiple layers and being impregnated with a chemical solution, the wet sheet for cleaning comprising:
hydrophobic fiber layers which are each arranged in a front surface layer and a back surface layer; and
a hydrophilic fiber layer which is arranged in an intermediate layer between the hydrophobic fiber layers,
wherein the hydrophobic fiber layers have an interlaced part where the hydrophobic fiber layers arranged on both of the front surface layer and the back surface layer, are interlaced with the hydrophilic fiber layer, the interlaced part has a higher fiber density than other part in the hydrophobic fiber layers,
wherein the interlaced part has, on both of the front surface layer and the back surface layer, at least one slightly interlaced part and at least one highly interlaced part which is formed in a dent shape, all fiber densities within the at least one highly interlaced part are higher than all fiber densities within the at least one slightly interlaced part,
wherein the at least one slightly interlaced part is a part where a water-jet interlacing is done under a low pressure condition, and the at least one highly interlaced part is a part where a water-jet interlacing is done under a high pressure condition to the part where the water-jet interlacing is done under the low pressure condition, wherein the low pressure condition is a water pressure of 20 to 30 kPa, the high pressure condition is a water pressure of 60 to 80 kPa,
wherein the highly interlaced part is formed in an area ratio of 10 to 20% to an area of the front surface layer or the back surface layer in a plan view,
wherein the hydrophilic fiber layer is impregnated with the chemical solution whose discharge amount is 0.001 to 0.0038 g/cm$^2$, and
wherein the static friction resistance is 300 to 500 cN in a direction of wiping of the wet sheet for cleaning and 200 to 400 cN in a direction perpendicular to the direction of wiping.

2. The wet sheet for cleaning according to claim 1, wherein the chemical solution has a viscosity of 1 to 15 mPa·s at 25° C.

3. The wet sheet for cleaning according to claim 1, wherein the hydrophobic fiber layer includes polyethylene terephthalate fiber and a fiber diameter of the polyethylene terephthalate fiber is 3.3 dtex or more.

4. The wet sheet for cleaning according to claim 1,
wherein the at least one highly interlaced part comprises a plurality of highly interlaced parts and the at least one slightly interlaced part comprises a plurality of slightly interlaced parts, and
wherein the highly interlaced parts and the slightly interlaced parts are extended in a direction perpendicular to the direction of wiping and are formed alternately and successively in the direction of wiping.

5. The wet sheet for cleaning according to claim 2, wherein the hydrophobic fiber layer includes polyethylene terephthalate fiber and a fiber diameter of the polyethylene terephthalate fiber is 3.3 dtex or more.

6. The wet sheet for cleaning according to claim 2,
wherein the at least one highly interlaced part comprises a plurality of highly interlaced parts and the at least one slightly interlaced part comprises a plurality of slightly interlaced parts, and
wherein the highly interlaced parts and the slightly interlaced parts are extended in a direction perpendicular to the direction of wiping and are formed alternately and successively in the direction of wiping.

7. The wet sheet for cleaning according to claim 3,
wherein the at least one highly interlaced part comprises a plurality of highly interlaced parts and the at least one slightly interlaced part comprises a plurality of slightly interlaced parts, and
wherein the highly interlaced parts and the slightly interlaced parts are extended in a direction perpendicular to the direction of wiping and are formed alternately and successively in the direction of wiping.

8. The wet sheet for cleaning according to claim 5,
wherein the at least one highly interlaced part comprises a plurality of highly interlaced parts and the at least one slightly interlaced part comprises a plurality of slightly interlaced parts, and
wherein the highly interlaced parts and the slightly interlaced parts are extended in a direction perpendicular to the direction of wiping and are formed alternately and successively in the direction of wiping.

* * * * *